July 6, 1965

T. E. CROMPTON 3,192,563

LAMINATED SPINNERET

Filed June 25, 1962

INVENTOR.
T. E. CROMPTON

BY

*Leonard A. Willson Jr.*

ATTORNEY

July 6, 1965  T. E. CROMPTON  3,192,563
LAMINATED SPINNERET
Filed June 25, 1962  2 Sheets-Sheet 2

INVENTOR.
T.E. CROMPTON
BY
Leonard A. Wilson Jr.
ATTORNEY

_United States Patent Office_

3,192,563
Patented July 6, 1965

3,192,563
LAMINATED SPINNERET
Thomas E. Crompton, Cary, N.C., assignor to Monsanto Company, a corporation of Delaware
Filed June 25, 1962, Ser. No. 204,814
7 Claims. (Cl. 18—8)

This invention relates to an apparatus for producing artificial filaments of composite character. More particularly, this invention relates to improved apparatus for producing composite artificial filaments characterized by an appreciable crimp.

In accordance with the present invention, two or more filament-forming materials of different properties, in a fused or plasticized state or in the form of solutions thereof, are extruded in separate or only partially intermingled phases through a common orifice or a plurality thereof where they are joined together in eccentric or side-by-side relation into a setting medium which may be either gaseous or liquid, functioning either by cooling, precipitating, or evaporative effect, to form unitary filaments in each of which the different materials form separate portions of the body of the filament.

Any of the filament-forming materials or solutions may be utilized including viscoses, proteins, such as caseins and soya bean proteins, cellulose derivatives, such as cellulose acetate and ethyl celluloses, and resins, such as nylons, the vinyl resins, especially the copolymers of vinyl chloride and vinyl acetate, and the vinylidene halides. When different cellulose xanthates or viscoses are used, they may differ as to either age, cellulose content, sodium hydroxide content, carbon disulfide content, as to the type of cellulose from which they are made, such as wood pulp or cotton pulp, or as to any two or more of these factors. Where other cellulose derivatives such as the esters or ethers are used, they or their solutions may differ as to viscosity, cellulose content, or as to degree of polymerization or substitution of the cellulose change therein. Where resin solutions are used, the solutions may differ as to kind of resin, viscosity, and the degree of polymerization of the resin. Two spinning materials of different classes may be combined, such as a protein with a viscose, a protein with a cellulose acetate, or a cellulose acetate with a vinyl resin. It is only necessary that the materials in the form employed, whether fused or in solution, do not mutually precipitate one another and that they adhere together in the final filaments.

The filaments may be extruded into either a liquid or a gaseous setting or precipitating medium depending upon the solutions that are used. For instance, viscose solutions may be extruded into an acid precipitating bath and other cellulose derivatives and resins or their solutions may be extruded into either a liquid or a gaseous medium.

When it is desired to produce crimpy filaments, the filaments, shortly after extrusion, are stretched and are either immediately thereafter permitted to relax or, after formation of the filaments, they are plasticized, such as by wetting, in a relaxed condition in order to effect shrinkage. Again, completely set filaments, whether stretched or not during formation, may be subsequently stretched, plasticized and relaxed to effect shrinkage and consequent crimping. Various forms of apparatus may be used for stretching the filaments, as for example, by passing them about positively driven rollers, wherein succeeding rollers are driven at succeedingly higher speeds. Alternatively, a thread-storing, thread-advancing device about which the filaments continuously travel in a helical path, the individual convolutions of which become progressively larger, may as well be employed. The stretching procedure orients the micelles or molecules of the several component materials making up each of the filaments to different degrees and, where it is performed as an after-stretching procedure, it is carried to such an extent that at least one, and preferably all components of the filament, are stretched beyond the elastic limit so that the filament is in a condition of unbalanced stresses across its cross-section. When relaxed and subjected to a shrinking process, the several components of the filaments will shrink or contract to different degrees, with the result that the filament will have an appreciable crimp which is generally such that the filaments takes the form of a regular or irregular helical coil which may reverse itself in direction at more or less frequent intervals of regular or irregular occurrence, and such that the eccentric components of a filament follow a helical path about the longitudinal axis of the filament, which path may reverse itself at more or less frequent irregular intervals. The component material undergoing the greater shrinkage during the crimp formation or having the greater elastic recovery after stretching generally has been found to form the inner portions of the filament at the bends of the crimp therein.

The individual crimped filaments produced by the apparatus of this invention in their state of normalcy are characterized by a stabilized condition having an inherent distortion which makes the crimp one of a permanently recoverable character. The filaments, whether crimped or not, have a unitary structure having a cross-section at all points of the filament length which comprises two or more substantially distinct areas, each of which has a different composition than that of the others and at least one of which is eccentrically disposed with respect to the filament cross-section. At least two of the component areas are composed of materials having distinct differences in properties and especially in those properties which give rise to differences in shrinkage in response to those influences which can effect shrinkage or an elastic recovery from a stretched condition.

Where it is desired to incorporate the separate characteristics of two individual polymeric species into one filamentary structure, it is frequently advantageous to spin the two polymeric species in such a way that each species remains separate and distinct within a different area of the fiber cross-section. This is particularly true where the differences in properties of the two species are such as to produce a crimped fiber when the two species are spun in eccentric relationship to each other. For example, when two polymeric species having different shrinkage characteristics appear in eccentric relationship to each other in a single fiber, that fiber will develop a desirable spiral-type crimp when it is treated under conditions which cause the two components to shrink.

Various embodiments of spinning apparatus for producing composite or side-by-side fibers from two separate solutions or melts which are capable of forming fibers on evaporation, coagulation, or cooling which will produce the desired results are presently available, but it is a common objection to such devices that they are prohibitively intricate in design and costly in manufacture. The high cost is largely a result of the abundance of minute passages requiring very precise drilling and milling operations involved in the individual designs. A device to be effected with simplified fabrication techniques and requiring less precise machining with no sacrifice in end product quality is definitely indicated.

It is, therefore, an object of the present invention to provide a novel spinneret design susceptible to heretofore unrealized economies in fabrication without sacrificing the quality of the end product. A further object is a high precision spinneret readily adaptable to mass-production techniques which may be utilized to produce either conjugated or non-conjugated filaments. Still another object of the invention is to provide orifice plates so designed as to facilitate the rapid and easy composition of laminated spinnerets, which plates have cut-out or recessed portions of such configuration as to define, when used in conjunction with similarly designed plates, a plurality of variously-shaped spinneret orifices or slots, each fed by a plurality of feeder passages to thereby effect variable modes of spinning.

In the drawings, which are merely illustrative of some of the possible embodiments of the present invention:

According to the present invention, the foregoing and other objects are attained by providing a spinneret design of laminated construction, the component parts of which are of extremely simplified design, making possible considerable savings in cost of fabrication and ease of operation. The concept comprehends the use of relatively thin, inexpensive plate stock in which there is formed by stamping, machining, chemical etching, ultrasonic abrasion, or other suitable techniques of metal fabrication, voids, recesses and depressions of novel alignment and configuration, which plates, when clamped together in operative fashion, result in a spinneret assembly, having intricately configured passageways, which spinneret is capable of extruding variously conjugated and non-conjugated filaments of varying denier and cross-section without any sacrifice in quality of the end product. Heretofore, such passage configurations have been effected in the prior art spinnerets by intricate and costly machining operations on relatively massive pieces of metal.

Figure 1:
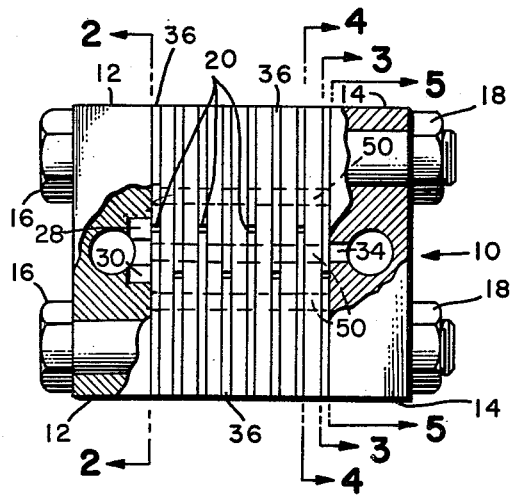
FIG. 1 is a partially sectionalized, assembled view of the spinneret.
Figure 2:
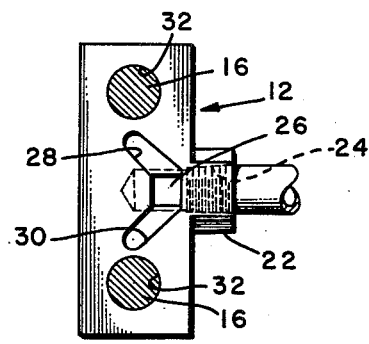
FIG. 2 is a section taken on line 2—2 of FIG. 1 and showing details of the double-feed end block.

Referring now in detail to the drawings, wherein like reference numerals designate identical or corresponding parts throughout the several views, and more particularly to FIG. 1, wherein there is shown as assembled spinneret 10 made in accordance with the concepts of this invention, with portions cut away for greater clarity. Spinneret 10 is seen to basically comprise a series of plates stacked in laminated or sandwich-fashion and clamped between end blocks 12, 14 by means of stud bolts 16 and nuts 18, the view of the assembled spinneret in FIG. 1 being of its spinning face to show one possible arrangement of the spinneret orifices 20. For a clearer understanding of the interrelationship between the variously configured plates and feeder end blocks, the reader is referred to the showings of FIGS. 2 through 5. FIG. 2, which is taken on section line 2—2 of FIG. 1, shows the details of the double-feed end block 12, which is shown at the left end of the assembled spinneret, as viewed in FIG. 1. This double-feed block 12, in cooperation with the single feed block 14, shown in the right hand portion of FIG. 1 and in detail in FIG. 5, performs two vital functions in the operation of the instant spinneret. One such function is, that by virtue of their mass, rigidity and precise flatness of their inner faces, these end blocks serve to compress the intervening plates into highly conformed parallel planes to assure more perfect alignment of the various passageways and to minimize the possibility of leakage between the various plates. Another such function of these blocks is to serve as distribution manifolds between lines supplying a spinnable medium to the spinneret and the various passageways defined therein by the orifice and spacer plates when stacked in proper alignment. The rectangular outline of end blocks 12, 14 and the orifice and spacer plates 36, 48, respectively, is not critical, although it has been found convenient in machining operations. The double feed block 12 is provided with an integrally formed, upstanding collar 22 internally bored and threaded at 24 for reception of a supply line, not shown, through which is conveyed the material to be spun. Communicating with this internal bore is a manifold passage 26 having branched portions 28, 30, these branched portions being so shaped as to be in alignment with selected portions of the voids or passageways formed in the spacer and orifice plates, as will later be more fully explained. To either side of these branched portions, there is formed relatively large holes 32 for reception of stud bolts 16. The single-feed end block 14 has a similar configuration to that of the double-feed block 12, save that, in lieu of the branched portions 28, 30, there is provided a single supply port 34, the function of which will become more apparent upon a study of the internal configurations of the spacer and orifice plates, to which reference is now made.

Figure 3:
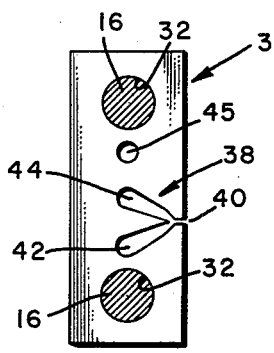
FIG. 3 is a section taken on line 3—3 of FIG. 1 showing the details of a typical orifice plate.

The orifice plates, a typical embodiment of which is illustrated in FIG. 3, are seen to be of an outline similar to that of the end blocks 12, 14 and to have similarly located holes 32 so spaced as to be capable of precise alignment with similarly numbered holes in the end blocks. The orifice plate illustrated in FIG. 3 is seen to comprise a Y-shaped void, the lower portion of which terminates in a slot which communicates with a peripheral edge of plate 36 to thereby define a spinning orifice or slot 40. The particular configuration of the upper branches of the Y-shaped void 38 is not critical except in so far as they should be so dimensioned as to assure as uniform a pressure distribution at the various orifice slots as is conveniently possible. In general, this will dictate that the upper branch portions 42, 44 decrease in cross-sectional area as they approach the slot 40 where these branches juncture. Preferably, the juncture of the two feeder passages 42, 44 should be a gently merging one rather than abrupt, in order to minimize intermixing of the spinnable mediums conveyed therealong. To the right of the Y-shaped void 38, as viewed in FIG. 3, there is provided a distribution aperture 45 which is spaced from the right hand branch portion 44 a distance equal to that between said branch and the left-hand branch 42, as viewed in FIG. 3.

Figure 4:
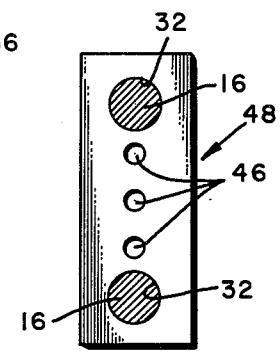
FIG. 4 is a sectional view taken on line 4—4 of FIG. 1 showing details of a typical spacer plate.
Figure 5:
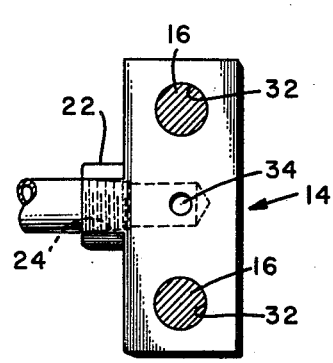
FIG. 5 is a view of the single-feed end block similar to that of the double-feed end block shown in FIG. 2, and FIGS. 6, 7, and 8 are views similar to FIGS. 3 and 4 showing the details of another possible embodiment of the orifice and spacer plates.

The spacer or partition plates 48, an example of which is best shown in FIG. 4, are seen to be provided with a series of distribution apertures 46 so located as to be capable of alignment with the upper extremities of branch portions 42, 44 and the distribution aperture 45 of the orifice plate illustrated in FIG. 3. At either end of the spacer plate there is provided a hole 32 of the same size and alignment as similarly numbered holes in the feeder blocks 12, 14 and the orifice plate 36. Adjacent the lower edge of end blocks 12, 14, orifice plates 36 and spacer plates 48 there are provided a number of dowel holes, three being shown, which are adapted to receive dowel pins which may optionally be employed as extra assurance of inter-plate fluid integrity of the assembled spinneret.

Assembly of the spinneret is quite simple, involving nothing more than the stacking of the spacer and orifice plates in alternating sequence in any desired quantity, which sequence of plates are bounded at either end by the feed blocks 12, 14, the various plates and blocks being so arranged as to align holes 32, whereupon stud bolts 16 are inserted therethrough and bolted down sufficiently to overcome any warp that may be present in the relatively thin spacer and orifice plates and to insure against inter-plate leakage. It will be understood that when the plates and blocks are so arranged and clamped together, the configuration of the various passageways and apertures is such as to effect a particular alignment thereof whereby a plurality of passageways are defined along which discrete streams of the same or different spinnable mediums may be channeled to a given orifice slot.

Considering the alignment of the particular plate configurations illustrated, it will be seen that upon placing the orifice plate of FIG. 3 upon the spacer plate of FIG. 4, the upper extremities of the feeder passages or branch portions 42, 44 will align with the two left-most distribution apertures 46 of the spacer plate, as viewed in FIG. 4, the right-most distribution aperture of the spacer plate aligning with the single distribution aperture 45 of the orifice plate 36. By placing a second orifice plate against the obverse side of the spacer plate in a fashion whereby the upper reaches of the Y-shaped void 38 align with the two right-most distribution apertures 46 of spacer plate 48, so that the distribution aperture 45 of orifice plate 36 aligns with the left-most distribution aperture 46 of spacer plate 48, and by continuing such a sequence of orifice and spacer plates, wherein each orifice plate has been turned 180° about its short dimension relative to its two neighboring orifice plates, it will be seen to result in a spinneret of laminated construction having a pair of parallel rows of spinneret slots along one surface thereof as shown in FIG. 1 of the drawings, such surface being defined by the edge portions of the orifice and spacer plates. Each slot will be spaced laterally, in the plane of the plates, with respect to its adjacent numbers, to thereby minimize the chance of the filaments withdrawn from such slots coming into contact while in a highly plasticized condition. Each of these spinneret orifices or slots 40 is seen to be fed by its associated pair of branched feeder passages 42, 44, the slot and the feeder passages 42, 44 defining the previously mentioned Y-shaped void. As also previously mentioned, the upper reaches of these voids align with the distribution apertures 46 of spacer plates 48 to define three distribution ports 50, as best viewed in FIG. 1, when the spinneret has been fully assembled, these ports communicating between the upper reaches of the Y-shaped voids of the respective orifice plates and the branched manifold passage 26 of the double-feed end block 12 and the single distribution port 34 of the single feed end block 14. In the particular configuration illustrated, the spinnable medium supplied to the single-feed end block 14 is conveyed to the middle one of the three distribution ports, which port communicates with each of the branches 44 of the Y-shaped voids 38 throughout the length of the assembled spinneret. The spinnable medium supplied to the double-feed end block 12, which may be the same as that supplied to the single-feed end block 14, or a different medium if a conjugated filament is desired, is conveyed to the two outer-most distribution ports 50 by way of the branched distribution passage 26, having branched portions 28 and 30. As viewed in FIG. 2, the left-most branch portion 28 will communicate with the upper extremities of the left-most feeder passage 42 of the Y-shaped void 38 and the right-most branch portion 30 of the distribution passage 26, as viewed in FIG. 2, will communicated with the distribution aperture 46 to pass therethrough to the next orifice plate in line, whereat it will communicate with a similar feeder passage 42 of the Y-shaped void 38 the next-in-line orifice plate which orifice plate is oriented so that the Y-shaped void will appear to the right of the Y-shaped void of the preceding orifice plate, wherein such void will be in communication with the two right-most distribution apertures 46 of the intervening spacer plate. It will, therefore, be appreciated that the spinnable medium being supplied through the central distribution port is conveyed to each of the spinneret orifices or slots 40 in this system by way of feeder passage 44, whereas the spinnable medium supplied to the two flanking distribution ports will feed alternate numbers of the Y-shaped voids by way of feeder passages 42.

It should be mentioned that the use of the spacer or partition plates 48 is considered to be optional since their primary function is to effect sufficient spacing in the direction of the distribution ports 50 to prevent possible fusing of the filaments as they are extruded from the orifice slots 40. For example, in an arrangement where the thickness of the orifice plates and the distance measured in the plane of the plates between the orifice slots 40 is sufficient, in and of itself, to insure against the possibilities of such fusion, the partition plates may be omitted and the orifice plates of alternating orientation may be placed in direct face-to-face contact. Also, the configuration of the feeder passages or branched portions 42, 44 are not considered a critical part of this invention, the only requirement being that they be of such configuration as to align with adjacent spacer plates or orifice plates to define the requisite distribution ports 50 and to communicate between such ports and the orifice slots 40. It is likewise possible that a given orifice slot 40 may be desired to be supplied by more than two feeder passages, whereby a third spinnable medium may be supplied to the orifice slot 40. The thickness of the orifice plates and the width of the orifice slots 40 are not critical to the present invention and may be varied over a wide range, depending on the filament type, whether conjugated or not, denier and cross-sectional configuration it is desired to obtain. For example, it has been found that suitable results may be obtained with orifice plates varying in thickness from three hundredths of an inch to one tenth of an inch. By varying the thickness of the orifice plates, with a consequent variation of a cross-sectional configuration of the orifice slot 40, and by varying the relative pressures at which the spinnable mediums are supplied to the feder passages 42, 44, fibers having widely varying cross-sectional configurations and physical characteristics may be obtained, as will be appreciated by those skilled in the art of filamentary spinning.

Figure 6:
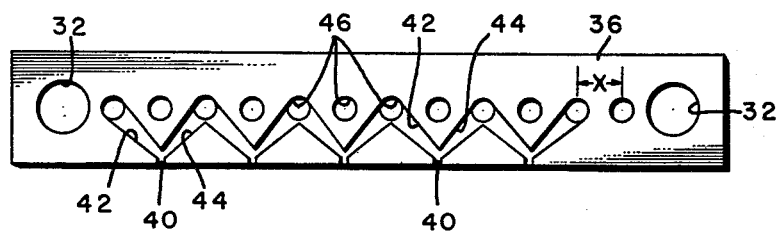
Figure 7:
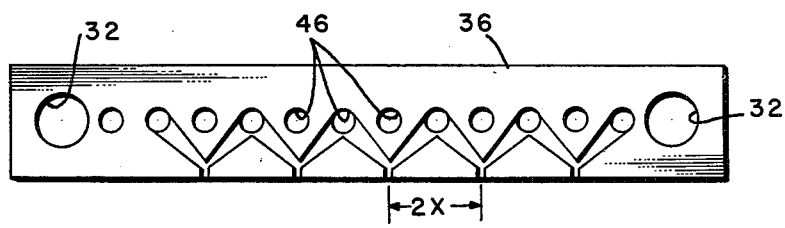
Figure 8:
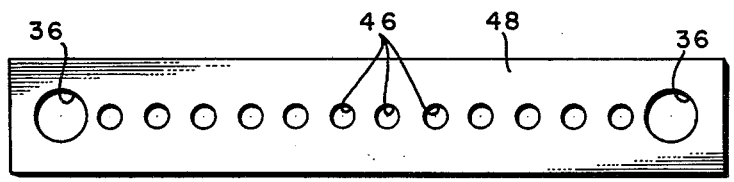

Reference will now be had to another of the many possible variations in the configurations of the passageways formed in the various plates, as contemplated by this invention. Referring to FIGS. 6 through 8, it is seen that one such embodiment may comprise orifice plates 38 and spacer plates 48 intervening a given pair of orifice plates. On either, or both, sides of each orifice plate there is formed, by chemical etching or other suitable process, a continuous, wave-like depression or recess, the crest of such wave-like depression registering with distribution apertures 46 in spacer plate 48 when the orifice and spacer plates are placed in face-to-face contact with holes 32 in alignment. Alternatively, similarly shaped passageways may be defined by employing a segmented orifice plate, the members of which are affixed by any suitable means, such as by spot-welding or dowelling, to a face of spacer plate 48. In either case, the bottom region of such wave-like depression or passageway communicates with a peripheral edge of the orifice plate by way of slot 40 to thereby define a spinning orifice.

To provide for lateral offset of adjacent orifice slots in the modified form of the orifice plates illustrated in FIGS. 6 and 7, the wave-like depression or passage is located off-center with respect to the center distance between holes 32 a distance of X, which is equal to the center-line distance between distribution apertures 46 in spacer plate 48. By this arrangement, orifice offset may be effected simply by placing the opposite faces of two identical plates toward each other, which plates may optionally be interposed by a spacer plate.

It will be appreciated that by stacking a desired number of such plates in a manner to align holes 32 there will be formed a laminated spinneret having a plurality of parallel rows of spinneret orifices or slots 40, each of which is fed by at least two distribution ports defined by a series of aligned distribution apertures 46, the feeder passages 42, 44 communicating between such ports and the orifice slots 40. By supplying a different spinnable medium to alternate distribution ports 50, a conjugated filament may be extruded from each of the individual orifice slots 40. Of course, a non-conjugated filament may be extruded merely by supplying the various distribution ports with the same spinnable medium, or differences in the cross-sectional make-up of the components of a conjugated or non-conjugated filament may be obtained by varying the pressures at which the different spinnable mediums are supplied to the alternating distribution ports and by varying the width of orifice slot 40 and/or the thickness of orifice plate 36.

Obviously, numerous modifications and variations of the present invention are possible in the light of the above teachings. It is, therefore, to be understood that within the scope of the appended claims, the invention may be practiced otherwise than as specifically described herein.

What is claimed is:

1. A spinneret comprising at least one spacer plate and at least one pair of orifice plates, said plates being arranged in face-to-face relationship to thereby form a laminated structure wherein said spacer plate is interposed between said pair of orifice plates, a plurality of uniformly spaced, aligned apertures formed in each of said plates to thereby define a plurality of spaced manifold passages extending perpendicular to the planes of said plates, each of said orifice plates having formed therein at least one substantially Y-shaped void, each upper branch of each such void communicating with a separate one of said plurality of aligned apertures common to such plate, the lower leg of such void terminating at an exterior edge of said plate to thereby define a spinning orifice.

2. A spinneret as defined in claim 1 wherein said apertures are uniformly spaced and said Y-shaped voids are laterally staggered from orifice plate-to-orifice plate a distance substantially equal to the distance between an adjacent pair of said apertures.

3. A spinneret comprising at least one pair of orifice plates mounted in parallel planes to form a laminated structure, a plurality of aligned apertures formed in each of said plates to thereby define a plurality of manifold passages extending perpendicular to the planes of said plates, each of said orifice plates having formed therein at least one substantially Y-shaped void having a pair of upper branches and a lower branch, each said upper branch communicating with a separate one of said plurality of aligned apertures common to such plate, the lower branch of such void terminating at an exterior edge of said plate to thereby define a spinning orifice.

4. A spinneret comprising at least one pair of orifice plates mounted in closely spaced, parallel planes, a plurality of aligned apertures formed in each of said plates to thereby define a plurality of distribution ports extending perpendicular to the planes of said plates, each of said orifice plates having formed therein a plurality of passageways, slots communicating with the periphery of each said plate, each of said passageways communicating between one of said apertures and one of said slots, each said slot communicating with at least two of said passageways to thereby define a spinning orifice supplied by at least two discrete sources of spinnable material.

5. An orifice plate for use in spinnerets, comprising a substantially planar plate member, a plurality of apertures formed in said plate member, at least two passageways formed in said plate member to intercept one another, each said passageway communicating with a separate one, an orifice slot communicating between the point of interception of said passages and the periphery of said plate.

6. For use in fabricating a laminated spinneret, an orifice plate, a bifurcated void formed in said plate to thereby define a pair of feeder passages converging at a point adjacent the peripheral edge of said plate, an outlet orifice communicating between the point of convergence of said feeder passages and the peripheral edge of said plate to thereby define a spinning orifice.

7. A distribution template for use in laminated spinnerets, said template having formed therein a series of spaced apertures, a pair of feeder passages registering with each of alternate numbers of said apertures and diverging away therefrom, each of said feeder passages intersecting with one of an adjacent pair of said feeder passages, an outlet orifice communicating between the edge of said template and each point of intersection of said feeder passages.

References Cited by the Examiner
UNITED STATES PATENTS

| | | | |
|---|---|---|---|
| 2,031,387 | 2/36 | Schwarz | 18—8 |
| 3,006,028 | 10/61 | Calhoun | 18—8 |
| 3,014,237 | 12/61 | Breen | 18—8 |

WILLIAM J. STEPHENSON, *Primary Examiner.*

MICHAEL V. BRINDISI, *Examiner.*